United States Patent
Gillespie

(10) Patent No.: US 6,256,379 B1
(45) Date of Patent: Jul. 3, 2001

(54) METHOD AND SYSTEM FOR CONVEYING SUPERVISION INFORMATION

(75) Inventor: Donald E. Gillespie, Boulder, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/163,841

(22) Filed: Sep. 30, 1998

(51) Int. Cl.⁷ .............................. H04M 3/22; H04M 7/00; H04M 15/00
(52) U.S. Cl. ........................... 379/230; 379/114; 379/350
(58) Field of Search .................. 379/207, 230, 379/229, 113, 114, 350

(56) References Cited

U.S. PATENT DOCUMENTS

| | | | |
|---|---|---|---|
| 5,425,084 | * | 6/1995 | Brinskele ........................ 379/112 |
| 5,710,809 | * | 1/1998 | Mashinsky ...................... 379/207 |
| 5,793,839 | * | 8/1998 | Farris et al. .................... 379/34 |
| 5,892,822 | * | 4/1999 | Gottlieb et al. ................. 379/220 |
| 6,055,306 | * | 4/2000 | Lozinski et al. ................ 379/230 |

* cited by examiner

Primary Examiner—Harry S. Hong
(74) Attorney, Agent, or Firm—Brooks & Kushman P.C.

(57) ABSTRACT

A method and system for conveying supervision information to a call processing system using an intelligent network is provided. A call originating at the call processing system is received by a network switch. The network switch sends a query to a service control point which returns a routing message to the network switch. The network switch routes the call and waits for supervision information corresponding to a request for subsequent information provided by the service control point. Upon receiving the supervision information at the network switch, the network switch informs the service control point of the supervision information. The service control point in turn notifies the call processing system of the supervision information. Advantageously, the interface need not have the ability to convey supervision information.

18 Claims, 2 Drawing Sheets

METHOD AND SYSTEM FOR CONVEYING SUPERVISION INFORMATION

TECHNICAL FIELD

The present invention relates to intelligent network systems and associated methods for conveying information.

BACKGROUND ART

The primary elements of an existing intelligent network are a switching system, a signaling network, a centralized database, and an operations support system which supports the database. In general, the switching system intercepts a call from a call source, and suspends call processing while launching a query through the signaling network to the centralized database. The database, in turn, retrieves the necessary information to handle the call, and returns that information through the signaling network to the network switch, which may be a local digital switch, so that the call can be completed. The operations support system administers the appropriate network and customer information that resides in the database.

The intelligence of the intelligent network is found at the service control points. A service control point is an on-line, real-time, fault-tolerant, transaction-processing database which provides call-handling information in response to network queries. The signaling network is made up of signal transfer points. A signal transfer point is a packet switch found in the common-channel signaling network. The signal transfer point is used to route signaling messages between network access nodes, such as switches and service control points. Signaling System 7 is a common communications protocol used in common-channel signaling networks.

In existing intelligent network architectures, including advanced intelligent network architectures, the call source is usually connected to the local call processing system before the call destination is connected. Further, when the call destination and the call source are linked together by a talk path, the local call processing system is not immediately aware of the connection because the interface may not be capable of conveying supervision information. As such, sometimes a call source is able to establish a talk path with a call destination without any record being made such as, for example, a billing record.

For the foregoing reasons, there is a need for a method and system for conveying supervision information to a call processing system that overcomes the problems and limitations of the prior art.

SUMMARY OF THE INVENTION

It is, therefore, an object of the present invention to provide a system and method for conveying supervision information to a call processing system.

In carrying out the above object, a method for conveying supervision information to a call processing system using an intelligent network is provided. The intelligent network includes a signal transfer point connected to the call processing system and connected to a network switch. The call processing system is connected to the network switch by an interface. The interface need not be capable of conveying supervision information. The signal transfer point is connected to a service control point and connected to a service location register. The method comprises originating a call at the call processing system. The call has a source capable of communicating with the call processing system; and, the call has a destination. The call is received over the interface at the network switch. A query is sent from the network switch to the service control point. A routing message is sent to the network switch from the service control point in response to the query. The routing route message includes a request for subsequent information. The call is then routed from the network switch to the call destination.

The method further comprises waiting at the network switch for supervision information corresponding to the request for subsequent information from the destination. Upon receiving the supervision information at the network switch, the service control point is informed of the supervision information. The service control point sends a message to the service location register indicative of the supervision information. The service location register sends a message to the call processing system indicative of the supervision information.

The supervision information may be, for example, answer supervision information or disconnect supervision information. After receiving the supervision information, if desired, the call processing system may generate or terminate a talk path, or generate or terminate a billing record.

Further, in carrying out the above object, a system for conveying supervision information is provided. The system comprises a call processing system, a network switch, a signal transfer point, a service control point, and a service location register. The network switch is configured to wait for supervision information corresponding to the request for subsequent information from the destination, and then inform the service control point of the supervision information. The service control point is configured to send a message to the service location register indicative of the supervision information. The service location register is configured to send a message to the call processing system indicative of the supervision information which may be, for example, answer supervision information or disconnect supervision information.

Still further, in carrying out the present invention, a method for conveying supervision information in which the service control point performs the functions of a service location register in addition to the normal functions of the service control point. As such, a separate service location register is not required.

The advantages associated with embodiments of the present invention are numerous. For example, systems and methods of the present invention allow the call processing system to generate or terminate a talk path between the source and the destination when the message indicative of the answer supervision information or disconnect supervision information is received at the call processing system. Further, for example, systems and methods of the present invention allow the call processing system to generate or terminate a billing record when the message indicative of the answer supervision information or disconnect supervision information is received at the call processing system. Because supervision information is sent through the signaling network, the interface need not be capable of conveying supervision information.

The above object and other objects, features, and advantages of the present invention are readily apparent from the following detailed description of the best mode for carrying out the invention when taken in connection with the accompanying drawings.

BEST MODES FOR CARRYING OUT THE INVENTION

Figure 1:
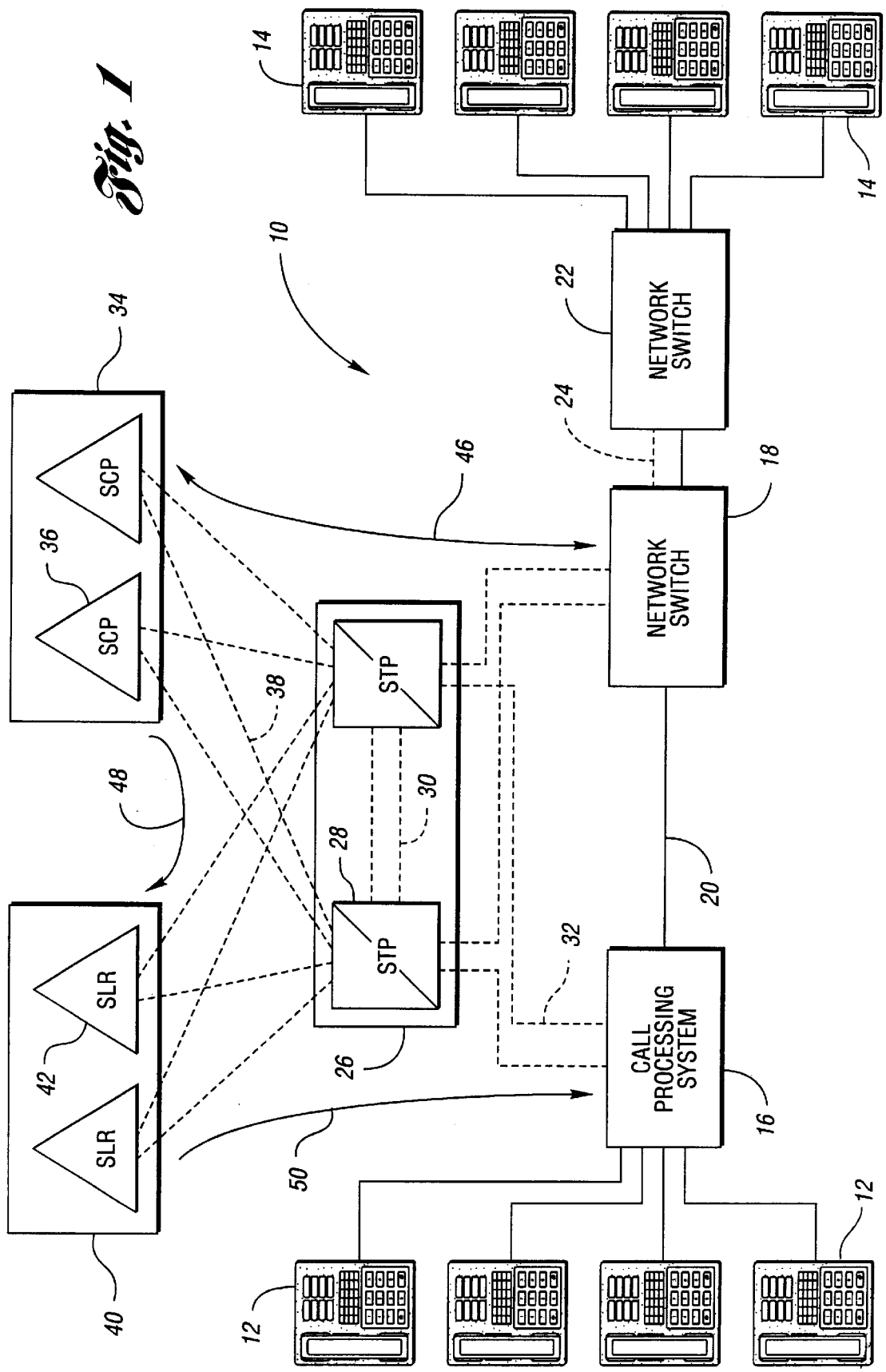
FIG. 1 is a diagram illustrating a system of the present invention for conveying supervision information.

With reference to FIG. 1, a system for conveying supervision information is generally indicated at 10. System 10 is used to connect a call source 12 to a call destination 14. The connections may be wired or wireless. A number of call sources are connected to a call processing system 16 which may be a remote digital terminal. Of course, other call processing systems may be suitable, as recognized by one of ordinary skill in the art. Call processing system 16 is connected to a network switch 18 by an interface 20. A suitable network switch is a local digital switch. Of course, there are other suitable alternatives as is appreciated by one of ordinary skill in the art. A suitable interface for connecting call processing system 16 to network switch 18 is a digital loop carrier, such as a GR-303 interface. Of course, other interfaces may be suitable as apparent to one of ordinary skill in the art. Advantageously, interface 20 need not have the ability to convey supervision information, as in accordance with the present invention, such information is conveyed with the signaling network. Network switch 18 routes a call from call processing system 16 to any of a number of call destinations 14 which may connect to, for example, another network switch 22.

Call source 12 communicates with call processing system 16, and then the call is intercepted by network switch 18. Network switch 18 sends out a query asking how to handle the call. System 10 further includes sets 26 of signal transfer points 28. Signal transfer points 28 are usually deployed in pairs for reliability reasons. Signal transfer points 28 of the same set 26 are connected by high capacity connections between the geographically separated members of the pair. Call processing system 16 and network switch 18 are connected to signal transfer point pair 26 by links 32. The intelligence of system 10 is contained in sets 34 of service control points 36. Service control points 36 are also usually deployed in pairs for reliability reasons. Service control points 36 provide call handling information, or a routing message which may be an analyze route message, to network switch 18 in response to the query. In accordance with the present invention, the routing message sent to network switch 18 by service control point pair 34 includes a request for subsequent information. A suitable request for subsequent information may include a next event list.

System 10 further includes a set 40 of service location registers 42 which preferably are WIRELESS SERVICE LOCATION REGISTERS. Service location registers 42 are usually deployed in pairs for reliability reasons. Further, service location register pair 40 is connected to signal transfer point pair 26 by links 44. Similarly, service control point pair 34 is connected to signal transfer point pair 26 by links 38.

Although existing systems have all calls at call processing system 16 intercepted by network switch 18 and then routed, it is believed that call processing system 16 may be able to perform localized call routing. As such, service location register pair 40 may contain intelligence for use by call processing system 16.

It is to be appreciated that service control point 36 may perform the functions of a service location register 42 in addition to the normal functions of service control point 36. As such, in this alternative embodiment, a separate service location register is not required.

In operation, a call originates at call processing system 16 and is received over interface 20 by network switch 18. Network switch 18 sends a query through signal transfer point pair 26 to service control point pair 34. Service control point pair 34 sends a routing message including a request for subsequent information, such as a next event list, to network switch 18 in response to the query. Network switch 18 then routes the call according to the routing message. Network switch 18, as instructed, waits for supervision information from the call destination 14. Of course, the above description describes operation of an advanced intelligent network, and one of ordinary skill in the art appreciates that embodiments of the present invention are applicable to other networking techniques.

Upon receiving the supervision information at network switch 18, network switch 18 informs service control point pair 34 of the supervision information. The communications back and forth between network switch 18 and service control point pair 34 are indicated by arrow 46, and preferably use the advanced intelligent network (AIN) protocol. Service control point pair 34 sends a message to service location register pair 40 that is indicative of the supervision information. The message from service control point pair 34 to service location register pair 40 is indicated by arrow 48 and preferably uses the IS-41 protocol. Of course, the protocols mentioned above are merely suitable protocols mentioned for exemplary purpose and are not meant to be limiting.

Service location register pair 40 then sends a message to call processing system 16 indicative of the supervision information, as indicated by arrow 50 and which preferably uses the IS-41 protocol. Of course, other protocols may be suitable, and the mention of IS-41 is merely an example. The supervision information may be, for example, answer supervision information indicative of an answer at call destination 14 or may be disconnect supervision information indicative of a hang-up or disconnection at call destination 14. It is to be appreciated that the ability of the network system to translate from one protocol to another has advantages that are apparent to one of ordinary skill in the art, and that the protocols mentioned above are exemplary.

When the supervision information is answer supervision information, call processing system 16 generates a talk path between call source 12 and call destination 14 by forming a connection between call source 12 and call processing system 16 to complete the talk path. Call processing system 16 generates the talk path upon receiving the message indicative of the answer supervision information. In addition to generating the talk path, call processing system 16 may, if desired, generate a billing record when the message indicative of the answer supervision information is received at call processing system 16.

If the supervision information is disconnect supervision information, then call processing system 16 may terminate the talk path or terminate the billing record when the message indicative of the disconnect supervision information is received at call processing system 16.

Figure 2:
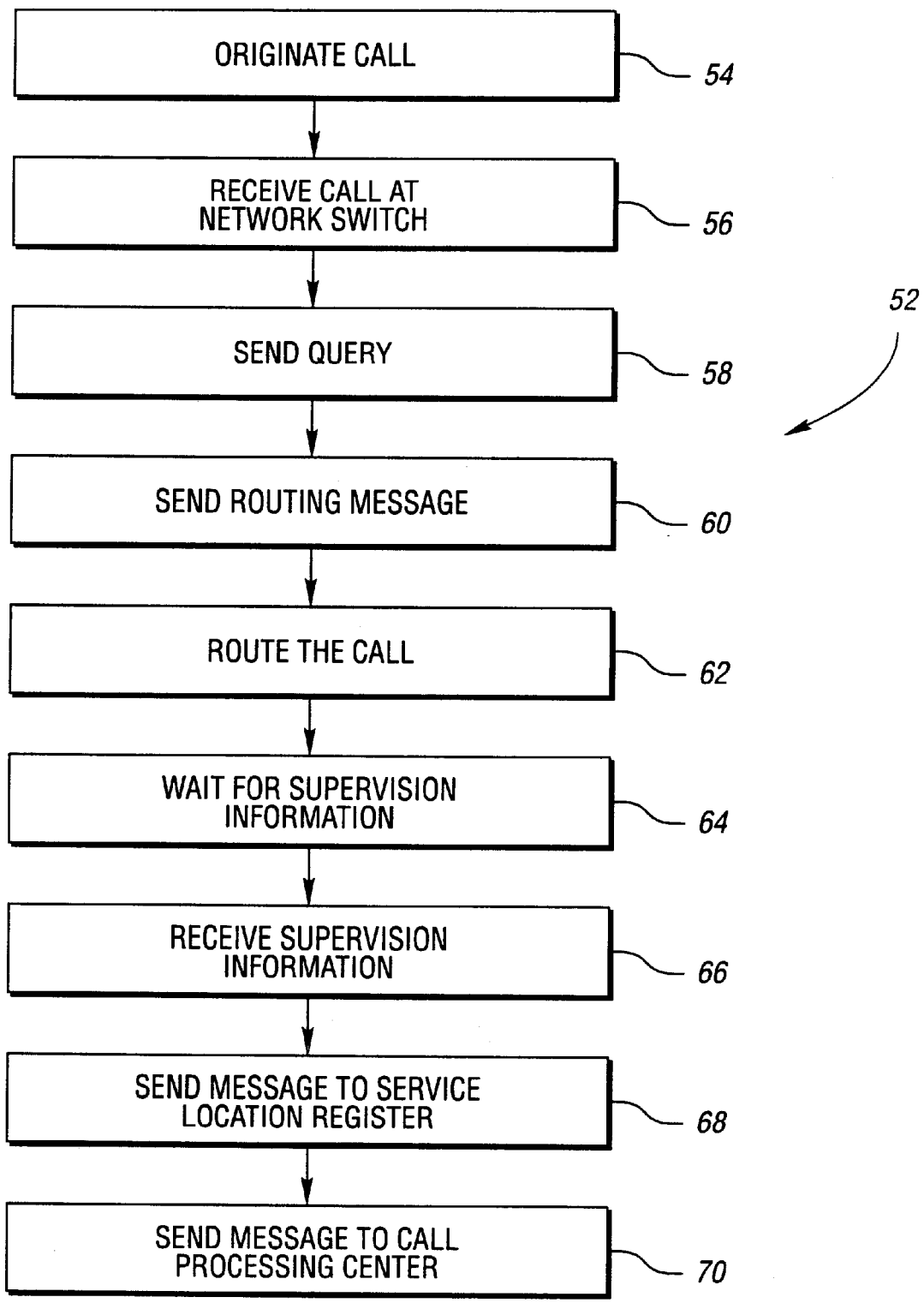
FIG. 2 is a block diagram illustrating a method of the present invention for conveying supervision information to a call processing system.

Referring to FIG. 2, a block diagram representing a method of the present invention is generally indicated at 52. At block 54, a call is originated at the call processing system. At block 56, the call is received at the network switch. At block 58, the network switch sends a query to the service control point. At block 60, the service control point sends a routing message to the network switch.

The network switch routes the call at block 62; and, the network switch waits for supervision information from the call destination at block 64. At block 66, supervision information is received, and the service control point is informed of the supervision information. At block 68, the service control point sends a message to the service location register, which may be a WIRELESS SERVICE LOCATION REGISTER, indicative of the supervision information. At block 70, the service location register sends a message to the call processing system indicative of the supervision information. At this time, the call processing system may, for example, generate or terminate a talk path, or generate or terminate a billing record based on the supervision information. Of course, as mentioned previously, the functions of the service location register may, if desired, be implemented in the service control point.

While the best mode for carrying out the invention has been described in detail, those familiar with the art to which this invention relates will recognize various alternative designs and embodiments for practicing the invention as defined by the following claims.

What is claimed is:

1. A method for conveying supervision information to a call processing system using an intelligent network including a signal transfer point connected to the call processing system and connected to a network switch, the call processing system being connected to the network switch by a digital loop carrier not having the ability to convey supervision information and the signal transfer point further being connected to a service control point and connected to a service location register, the method comprising:

originating a call at the call processing system, the call having a source capable of communicating with the call processing system and having a destination;

receiving the call over the digital loop carrier at the network switch;

sending a query from the network switch to the service control point;

sending a routing message to the network switch from the service control point in response to the query, the routing message including a request for subsequent information;

routing the call from the network switch to the call destination;

waiting at the network switch for supervision information corresponding to the request for subsequent information from the destination;

upon receiving the supervision information at the network switch, informing the service control point of the supervision information;

sending a message from the service control point to the service location register indicative of the supervision information;

sending a message from the service location register to the call processing system indicative of the supervision information; and modifying a connection between the call processing system and the call source to modify a status of a talk path between the source and the destination.

2. The method of claim 1 wherein the supervision information is answer supervision information.

3. The method of claim 2 further comprising:

generating a talk path between the source and the destination when the message indicative of the answer supervision information is received at the call processing system.

4. The method of claim 2 further comprising:

generating a billing record when the message indicative of the answer supervision information is received at the call processing system.

5. The method of claim 1 wherein the supervision information is disconnect supervision information.

6. The method of claim 5 further comprising:

terminating a talk path between the source and the destination when the message indicative of the disconnect supervision information is received at the call processing system.

7. The method of claim 5 further comprising:

terminating a billing record when the message indicative of the disconnect supervision information is received at the call processing system.

8. A system for conveying supervision information, the system comprising:

a call processing system capable of communicating with a call source;

a network switch connected by a digital loop carrier not having the ability to convey supervision information to the call processing system, the network switch being capable of receiving the call from the call processing system and sending a query, and the network switch being capable of reaching a call destination;

a signal transfer point connected to the call processing system, and connected to the network switch;

a service control point connected to the signal transfer point, the service control point being capable of sending a routing message to the network switch in response to the query, the routing message including a request for subsequent information; and a service location register connected to the signal transfer point, wherein the network switch is configured to wait for supervision information corresponding to the request for subsequent information from the destination, and then inform the service control point of the supervision information, and wherein the service control point is configured to send a message to the service location register indicative of the supervision information, and the service location register is configured to send a message to the call processing system indicative of the supervision information.

9. The system of claim 8 wherein the supervision information is answer supervision information.

10. The system of claim 9 wherein the call processing system is programmed to generate a talk path between the source and the destination when the message indicative of the answer supervision information is received at the call processing system.

11. The system of claim 9 wherein the call processing system is programmed to generate a billing record when the message indicative of the answer supervision information is received at the call processing system.

12. The system of claim 8 wherein the supervision information is disconnect supervision information.

13. The system of claim 12 wherein the call processing system is programmed to terminate a talk path between the source and the destination when the message indicative of the disconnect supervision information is received at the call processing system.

14. The system of claim 12 wherein the call processing system is programmed to terminate a billing record when the message indicative of the disconnect supervision information is received at the call processing system.

15. A method for conveying supervision information to a call processing system using an intelligent network including a signal transfer point connected to the call processing system and connected to a network switch, the call processing system being connected to the network switch by an interface, and the signal transfer point further being connected to a service control point, the method comprising:

originating a call at the call processing system, the call having a source capable of communicating with the call processing system and having a destination;

receiving the call over the interface at the network switch;

sending a query from the network switch to the service control point;

sending a routing message to the network switch from the service control point in response to the query, the routing message including a request for subsequent information;

routing the call from the network switch to the call destination;

waiting at the network switch for supervision information corresponding to the request for subsequent information from the destination;

upon receiving the supervision information at the network switch, informing the service control point of the supervision information; and sending a message from the service control point to the call processing system indicative of the supervision information.

16. The method of claim 15 wherein a first protocol is used for messages between the network switch and the surface control point, and a second protocol different than the first protocol is used for messages between the service control point and the call processing system.

17. The method of claim 16 wherein the signal transfer point is connected a service location register, and sending the message from the service control point to the call processing system further comprises:

sending a message from the service control point to the service location register indicative of the supervision information; and sending a message from the service location register to the call processing system indicative of the supervision information.

18. The method of claim 17 wherein the message from the service control point to the service location register and the message from the service location register to the call processing system use the same protocol, which is different than the protocol for messages between the network switch and the service control point.

* * * * *